J. Tresch,
Molding Pottery.
N° 38,430.  Patented May 5, 1863.
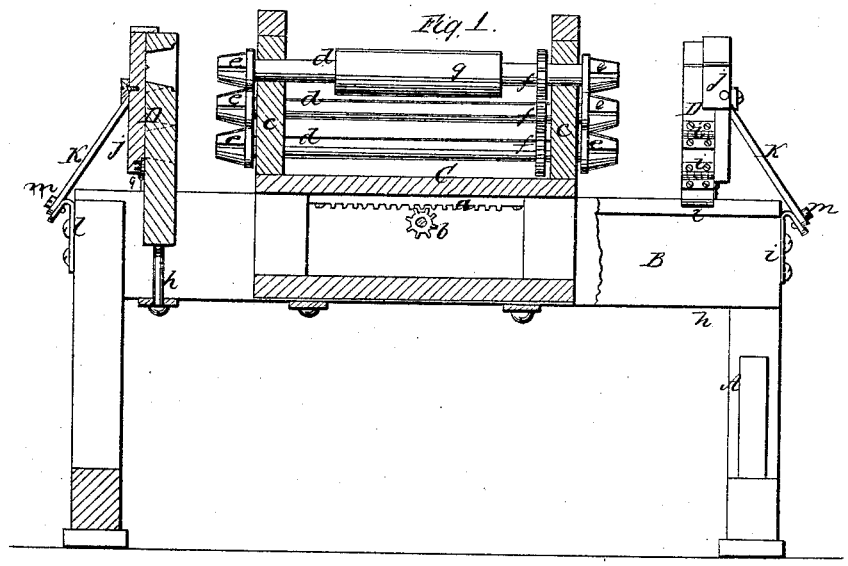
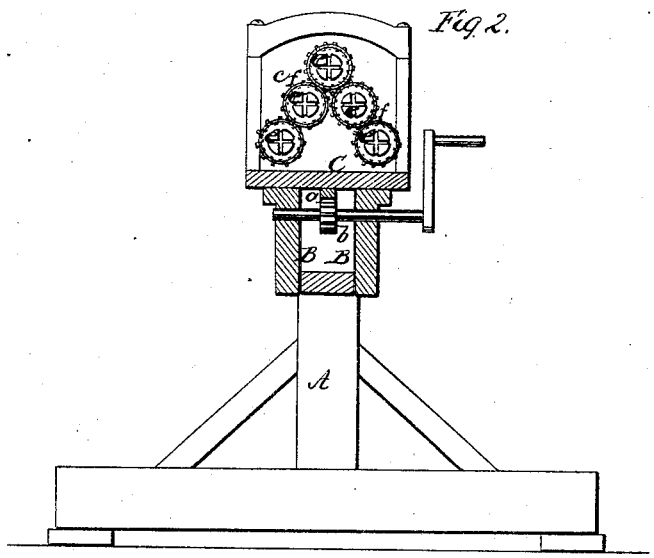
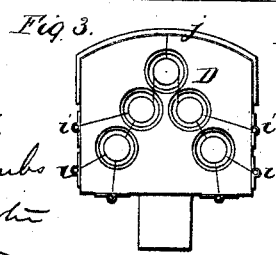
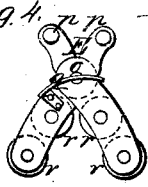
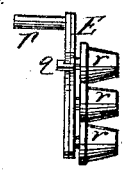
Witnesses,
J W Coombs
M M [illegible]
Inventor
John Tresch

UNITED STATES PATENT OFFICE.

JOHN TRESCH, OF NEW YORK, N. Y.

IMPROVEMENT IN MACHINERY FOR MOLDING POTTERY.

Specification forming part of Letters Patent No. 38,430, dated May 5, 1863.

*To all whom it may concern:*

Be it known that I, JOHN TRESCH, of the city, county, and State of New York, have invented a new and useful Improvement in Machines for Molding Pottery; and I do hereby declare that the following is a full, clear, and exact description of the same, reference being had to the accompanying drawings, forming a part of this specification, in which—

Figure 1 represents a longitudinal vertical section of my invention. Fig. 2 is a transverse vertical section of the same. Fig. 3 is a face view of one of the molds detached. Fig. 4 is a rear elevation of the tool used for removing the ready-made articles from the mold. Fig. 5 is a side elevation of the same.

Similar letters in all the figures indicate corresponding parts.

The object of this invention is to mold a large quantity of flower-pots or other similar articles by machinery in a short time, and with little labor.

The invention consists in the arrangement of a double-headed reciprocating carriage, each head being provided with a series of revolving cores, in combination with two stationary flasks, in such a manner that by moving the carriage in either direction a number of articles can be molded simultaneously, and during the time the molded articles are removed from one flask the operation of molding proceeds in the other flask.

The invention consists also in the arrangement of a hinged cap with a movable brace, in combination with the flask divided up into sections, which are connected by hinges in such a manner that by turning up the cap and supporting it by the brace the flask is rendered rigid and firm, and by turning the flask down the several sections of the flask can be separated for the purpose of emptying and elevating or filling the molds.

The invention consists, finally, in the employment, for the purpose of removing the molded articles out of the molds, of a remover consisting of two hinged spring-arms provided with a series of nipples corresponding in number and position to the molds in each flask in such a manner that when the articles in the molds are ready to be carried to the drying-kiln by means of the remover the several articles in each flask can be taken out simultaneously and deposited in any place without damage to their shape and with little loss of time.

To enable those skilled in the art to make and use my invention, I will proceed to describe it with reference to the drawings.

A represents a frame, made of wood or other suitable material, which supports the shears or ways B similar to the shears of a turning-lathe.

C is a carriage, to which a reciprocating motion is imparted by means of a rack, $a$, and pinion $b$, or in any other desirable manner. This carriage is provided with two heads, $c$, one on either end, which form the bearings for the shafts $d$, to the ends of which the cores $e$ are secured. The shafts $d$ are geared together by wheels $f$, and they receive a rotary motion by a belt running on the pulley $g$, the length of which is such that the belt can accommodate itself to the reciprocating motion of the carriage.

D D are the flasks, which are firmly secured in the ends of the shears by means of screws $h$, or by any other suitable means. Each flask is composed of several sections, which are connected by hinges $i$ and caps $j$, which are hinged to the rear or outside of said flasks, render the sections rigid whenever it is desired. These caps are supported by braces $k$, which are secured to the ends of the shears or to brackets $l$ by means of pivots $m$, so that they can be turned down out of the way when it is desired to open the flasks.

E is the remover, which consists of two arms, $n$, united by a pivot, $o$, similar to shears, and provided with handles $p$, so that they can be opened and closed. A spring, $q$, is applied to the arms in such a manner that the same has a tendency to close the arms. Said arms are provided with a series of nipples, $r$, corresponding in number and position to the number and position of the molds in each flask, and in shape to the interior of the articles to be molded.

The operation is as follows: The molds are filled with clay, and by moving the carriage toward one end of the shears the revolving cores enter the molds in one of the flasks and the clay in each mold is brought in the desired form. The carriage is now moved toward the opposite end of the shears, and while the articles in the flask on that end are forming the first flask is emptied and recharged, so that the operation of molding can be continued without interruption. By turning the caps of the flasks down the molds are easily cleaned and recharged, and by the remover E the molded articles can be readily taken out of the molds without impairing their shape.

I do not claim as my invention the employment of a revolving core on a reciprocating carriage; but,

Having thus fully described my invention, what I claim as new, and desire to secure by Letters Patent, is—

1. The arrangement of the double-headed reciprocating carriage C, each head being provided with a series of revolving cores, $e$, in combination with two stationary flasks, D D, one opposite to either head of the carriage, all constructed and operating as and for the purpose described.

2. The arrangement of a hinged cap, $j$, and brace $k$, in combination with a sectional flask, D, constructed and operating in the manner and for the purpose substantially as described.

3. The employment of the remover D, constructed substantially as specified, for the purpose shown and described.

JOHN TRESCH.

Witnesses:
J. W. COOMBS,
M. M. LIVINGSTON.